United States Patent [19]

Hatamura

[11] Patent Number: 5,414,528
[45] Date of Patent: May 9, 1995

[54] FACSIMILE MACHINE EQUIPPED WITH APPENDANT INFORMATION ADDING UNIT

[75] Inventor: Junji Hatamura, Nagoya, Japan

[73] Assignee: Brother Kogyo Kabushiki Kaisha, Aichi, Japan

[21] Appl. No.: 184,760

[22] Filed: Jan. 18, 1994

Related U.S. Application Data

[63] Continuation of Ser. No. 939,428, Sep. 4, 1992, abandoned, which is a continuation of Ser. No. 559,061, Jul. 30, 1990, abandoned.

[30] Foreign Application Priority Data

Jul. 28, 1989 [JP] Japan .................. 1-193873
Jul. 28, 1989 [JP] Japan .................. 1-193874

[51] Int. Cl.$^6$ ............................. H04N 1/00
[52] U.S. Cl. ................... 358/440; 358/402; 358/434; 358/435; 358/436; 379/100
[58] Field of Search ........... 358/434, 435, 436, 440, 358/402, 400, 403, 438, 498; 379/100

[56] References Cited

U.S. PATENT DOCUMENTS

| | | | |
|---|---|---|---|
| 4,710,951 | 12/1987 | Itezono | 379/100 |
| 4,811,111 | 3/1989 | Kurokawa | 358/440 |
| 4,849,816 | 7/1989 | Yoshida | 358/434 |
| 5,001,572 | 3/1991 | Hashimoto et al. | 379/100 |

OTHER PUBLICATIONS

The Complete Fax/9600-User's Guide Version 2.1 1988, pp. 1-117.

*Primary Examiner*—John K. Peng
*Assistant Examiner*—Edward Lefkowitz
*Attorney, Agent, or Firm*—Oliff & Berridge

[57] ABSTRACT

A facsimile machine including an appendant information adding unit for automatically preparing appendant information such as a cover page information and a call-back-message information and transmitting the information to the reception side together with the original images, whereby the appendant information is printed on a sheet to automatically prepare a cover page and/or a call-back-message page together with the original image sheets at the reception side. The appendant information adding unit comprises a memory unit for storing the appendant information, a transmission indicating unit for indicating a start of a transmitting operation, an addition indicating unit for indicating addition of the appendant information to the original images, and a control unit for reading out the appendant information stored in the memory unit and transmitting the read-out appendant information to the reception side together with the original images when the start of the transmitting operation and the addition of the appendant information are indicated.

4 Claims, 5 Drawing Sheets

FIG. 4

===COVER PAGE===

TO : ○○○ INDUSTRIES CO, LTD.
DESIGN DIV.

FAX : 001-81-52-XXX-XXXX

FROM : △△△ INTERNATIONAL INC.

FAX : 201-XXX-XXXX

O☐ PAGE(S) TO FOLLOW

COMMENT : URGENT.

===CALL BACK MESSAGE===

TO:     ○○○   INDUSTRIES CO, LTD.

DESIGN DIV.

FAX:  001-81-52-XXX-XXXX

FROM:   △△△   INTERNATIONAL INC.

FAX:  201-XXX-XXXX

PLEASE CALL AT ( TEL NO. )

201-□□□-□□□□

FACSIMILE MACHINE EQUIPPED WITH APPENDANT INFORMATION ADDING UNIT

This is a Continuation of application Ser. No. 07/939,428, filed Sep. 4, 1992, now abandoned, which in turn is a continuation of U.S. Ser. No. 07/559,061, filed Jul. 30, 1990, now abandoned.

BACKGROUND OF THE INVENTION

This invention relates to a facsimile machine, and more particularly to a facsimile machine having an appendant information addition unit for automatically adding appendant information for preparing a cover page, a call-back-message page and so on and transmitting the appendant information to a reception side together with the original document.

In a conventional facsimile machine, it is frequently required that various appendant pages such as a cover page, a call-back-message page, etc. on which various informations other than the original document are written should be transmitted to a reception side together with pages (sheets) of the original document.

The cover page is generally attached to an uppermost of the original document (sheets) to be transmitted, and includes a transmission information for the original document. However, in the conventional facsimile machine, the cover page must be manually prepared (or handwritten) by a user at the transmission side before the document is transmitted to the reception side. In addition, a protocall system must be newly provided to the facsimile machines at the transmission and reception sides if a user at the transmission side wants to have a telephone contact with the reception side after having transmitted the document.

In a case where plural kinds of documents are sequentially or separately transmitted to the reception side from the same or different transmitting sides and stacked in a pile in the facsimile machine of the reception side, the stacked documents must be sorted by the reception side as to every kind of documents sent by the transmitting side. Even if a cover page on which information for document transmission is written is used to enable the reception side to easily and smoothly sort the stocked documents, the cover page must be manually prepared (handwritten) by each of the transmitting sides. Manual preparation (handwriting) of the cover page before transmitting the document disturbs a user at the transmitting side from transmitting the document early.

Further, in a case where the user wants to have a telephone contact with the reception side immediately after transmitting a document, if the facsimile machine at the reception side has no protocall system, or if no one is located near the facsimile machine equipped with the protocall system, the reception side can not respond to the request of the transmitting side. The user at the transmitting side is unable to contact the person at the reception side on telephone. Even if a call-back-message page which requests the reception side to call back to the transmitting side is transmitted to reception side, the call-back-message page must be manually prepared (handwritten) by the transmitting side. This also disturbs the user from transmitting the document only.

SUMMARY OF THE INVENTION

An object of this invention is to provide a facsimile machine capable of automatically preparing appendant pages, such as a cover page for informing a document-transmission information, a call-back-message page which automatically and effectively requests the reception side to respond to a call back message and so on, to eliminate a user's disturbance of manually preparing (handwriting) the appendant pages.

in order to achieve the above objects, according to one aspect of this invention, a facsimile machine in which original images on original sheets are transmitted and received between transmitting and reception sides, includes an appendant information adding unit for automatically adding appendant information comprising at least one of a cover page information and a call-back-message information to the original images to be transmitted from the transmitting side and transmitting the appendant information to the reception side together with the original images, whereby the appendant information such as the cover page information or the call-back-message information is printed on the same sheet as or a different sheet from a sheet on which an original image is printed at the reception side.

The appendant information adding unit used in the facsimile machine of this invention comprises a memory unit for storing the appendant information, a transmission indicating unit for indicating a start of a transmitting operation, an addition indicating unit for indicating addition of the appendant information to the original images, and a control unit for reading out the appendant information stored in the memory unit and transmitting the read-out appendant information to the reception side together with the original images when the start of the transmitting operation and the addition of the appendant information are indicated.

BRIEF DESCRIPTION OF THE DRAWINGS

FIG. 4 shows a cover page which is prepared in accordance with the cover page addition unit as shown in FIG. 2;

DETAILED DESCRIPTION OF THE INVENTION

Preferred embodiments of this invention will be described hereunder with reference to the accompanying drawings.

Unlike the conventional facsimile machine, a facsimile machine according to this invention is newly provided with an appendant page addition unit for automatically preparing appendant pages containing at least one of comments for a cover page information, a call-back-message information, and so on at a transmitting side and transmitting these informations to a reception side such that these informations can be printed by a facsimile machine of the reception side, together with an original document to be transmitted. In the following embodiments, the appendant page addition unit serves as a cover page addition unit or a call-back-message unit which basically comprises memory units such as ROM and RAM for storing various informations for preparing a cover page, a call back message and so on. However, the function and construction of the appendant page addition unit according to this invention are not limited to the following embodiments.

Figure 1:
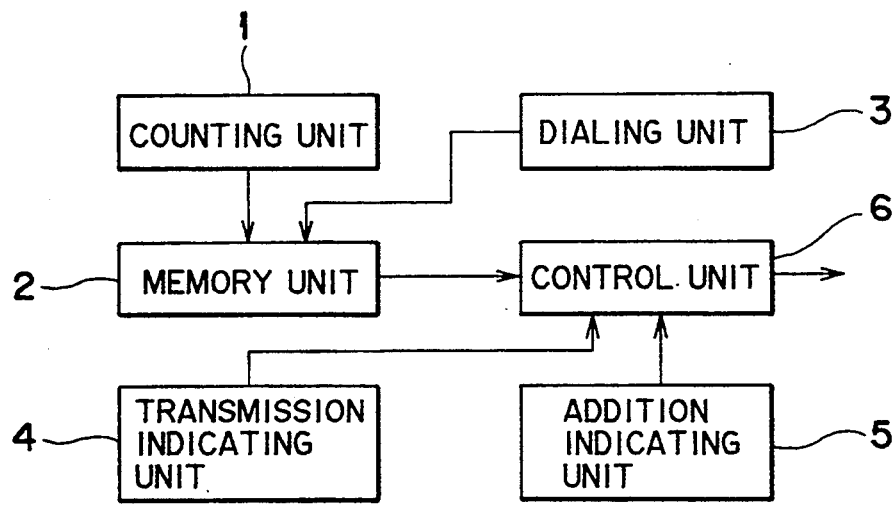
FIG. 1 is a block diagram for the arrangement of a cover page addition unit for automatically preparing a cover page for original sheets (document) to be transmitted.

FIG. 1 is a block diagram for the arrangement of a cover page addition unit for automatically preparing a cover page for original sheets (document) to be transmitted.

As shown in FIG. 1, the cover page addition unit according to this invention basically includes a counting unit 1 for counting the number of original sheets which are inserted to a facsimile machine of the transmitting side and read out by an image reader (13 as described below, every sheet is passed through the image reader 13,) a dialing unit 3 for carrying out a dialing operation for connecting the transmitting side to a reception side on a telephone circuit, a memory unit 2 for storing a cover page information including at least an information on the name and telephone (fax) number of the transmitting side, an information on the name of a reception side which are renewed every dialing operation by the dialing unit 3 and an information on the number of the transmitted original sheets which is renewed in accordance with a counted value obtained by the counting unit 1, a transmission indicating unit 4 for indicating a start of the transmission of images on the original sheets (document), an addition indicating unit 5 for indicating addition of the cover page to the transmitted original document, and a control unit 6 for reading out the cover page information stored in the memory unit 2 and transmitting the cover page information to the reception side at a predetermined time while converting the cover page information into an information which can be printed in the facsimile machine of the reception side, when a start of transmission and a cover page addition are indicated by the transmission indicating unit 4 and the addition indicating unit 5, respectively.

Figure 2:
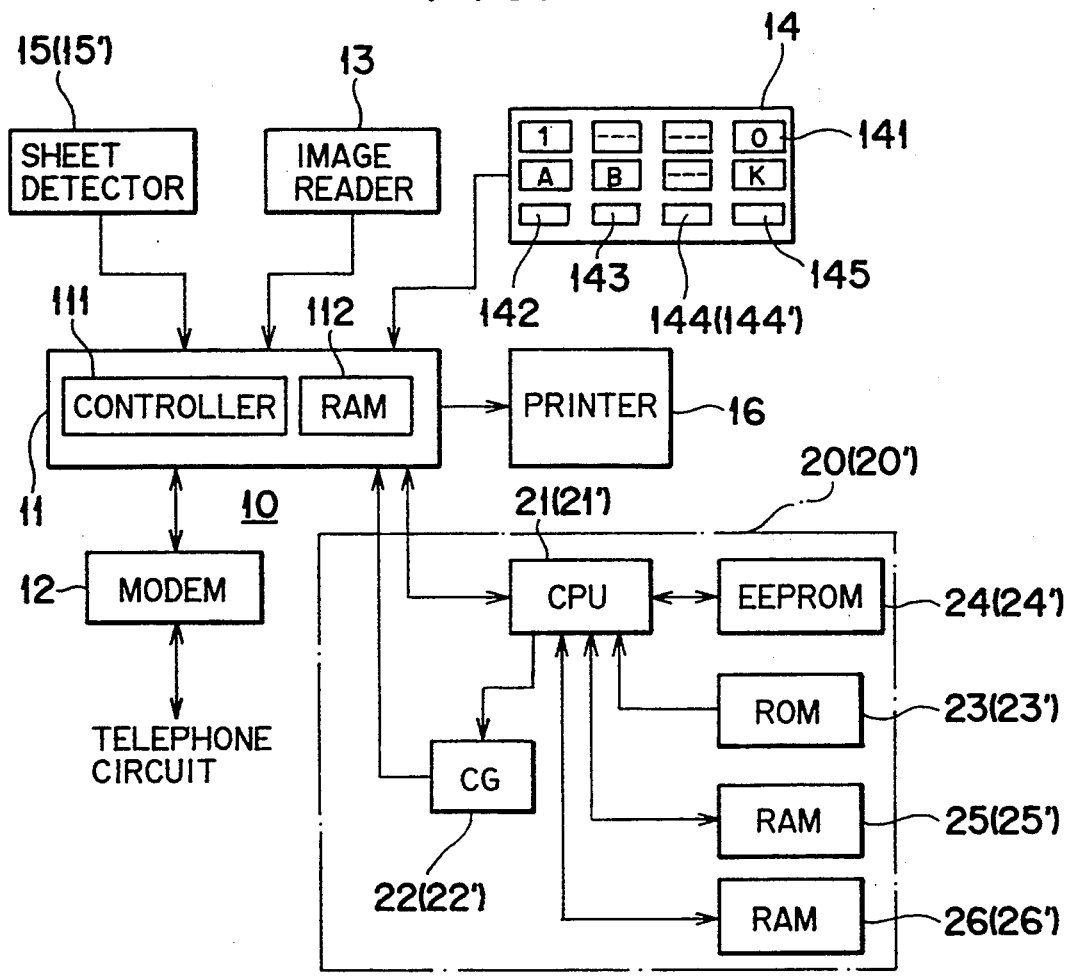
FIG. 2 is a block diagram for showing a first embodiment of the facsimile machine according to this invention in which the cover page addition unit is used.

FIG. 2 is a block diagram for showing a first embodiment of the facsimile machine according to this invention in which the cover page addition unit comprises plural memories and a CPU.

The facsimile machine 10 has a image-transmission and reception capabilities, and comprises a control unit 11 such as a microcomputer, a modem 12 for facsimile (hereinafter referred to as "modem"), an image reader 13 for reading out an image on a sheet passed therethrough, an operational key board 14, a sheet detector serving as a sheet-number counting unit 15 for detecting a sheet passed through the image reader 13 to count the number of sheets passed through the image reader 13 (that is, the number of sheets to be transmitted) and a printer 16 such as a thermal printer or the like.

In an image-transmission operation of the facsimile machine, the image reader 13 reads out images on the original sheets (document) passed therethrough and outputs the corresponding image signals to the control unit 11. Thereafter, the image signals are modulated by the modem 12 and transmitted to a reception side. On the other hand, in an image-reception operation of the facsimile machine, the image signals received through a telephone circuit are demodulated by the modem 12 to restore an original image.

The operational key board 14 has a ten key 141 for carrying out a dialing operation and so on, a start indication key 142 for indicating a start of transmission, an one-touch key 143 for carrying out an one-touch dialing operation, an appendent page addition key (in this embodiment, a cover page addition key 144 for indicating that a cover page is automatically prepared and transmitted to the reception side, and a comment selection key 145 for selecting one of comments to be printed on the cover page. In a practical use, only the ten key 141, an alphabet indication key and a function key for selecting one of functions are provided on the operational key board 14 to reduce the number of keys to be provided on the key board 14. However, in order to make this invention clearly understood, the following embodiments are described assuming that the elements 141 to 145 are independently provided on the operational key board 14.

The control unit 11 includes a controller 111 for controls transmitting and receiving operations of the facsimile machine in accordance with transmitting and receiving manuals which are beforehand predetermined on the basis of CCITT recommendation, and an RAM 112 (random access memory) which is used for storing therein binary image signals read out by the image reader 13 in the transmitting operation and which is used for storing therein demodulated image signals in the receiving operation. In the transmitting operation of the facsimile machine, the image information stored in the RAM 112 is read out, subjected to a data-compression processing, modulated by the modem 12, and then transmitted to the reception side. In the receiving operation, the received image signals are demodulated by the modem 12 to be stored in the RAM 112. Thereafter, the stored image signals are read from the RAM 112 every line on a sheet and inputted to the printer 16, so that an original image are printed (restored) on a sheet. These processes are carried out in the same manner as a conventional facsimile machine.

Unlike the conventional facsimile machine, the facsimile machine of this embodiment further includes a cover page addition unit 20.

The cover page addition unit 20 comprises a central processing unit (CPU) 21, a character generator (CG) 22, a ROM 23 for storing a program for preparing a cover page and at least three character selection data which are used for selecting one of title comments such as "COVER PAGE" for the cover page, for selecting one of plural kinds of comments to be written on the cover page such as "URGENT", and for selecting one of invariable characters such as a solid line, a dotted line, an underline and so on, and an EEPROM 24 for storing character selection data for selecting one of names of the reception sides corresponding to one-touch dials, for selecting one of telephone (fax) numbers of the reception sides, for selecting the name and telephone (fax) number of the transmitting side. The EEPROM 24 is used so that an user can easily register and alter the names and telephone numbers of the reception and transmitting sides while assigning these informations to one-touch dials.

The cover page addition unit 20 further includes a RAM 25 for storing other character selection data such as telephone (fax) dials (numbers) other than the one-touch dials, and an RAM 26 for selectively storing the desired character data stored in the ROM 23, the EEPROM 24 and the RAM 25 in accordance with addresses each of which are assigned to any position on the cover page.

In response to an instruction signal from the control unit 11, the indicated character selection data which are stored in the EEPROM 24, the ROM 23 and the RAM 25 are stored in the RAM 26 in accordance with the program stored in the ROM 23 by the CPU 21. The character selection data stored in the RAM 26 are converted into characters by the character generator 22 and then the characters thus obtained are developed in the RAM 112.

Figure 3:
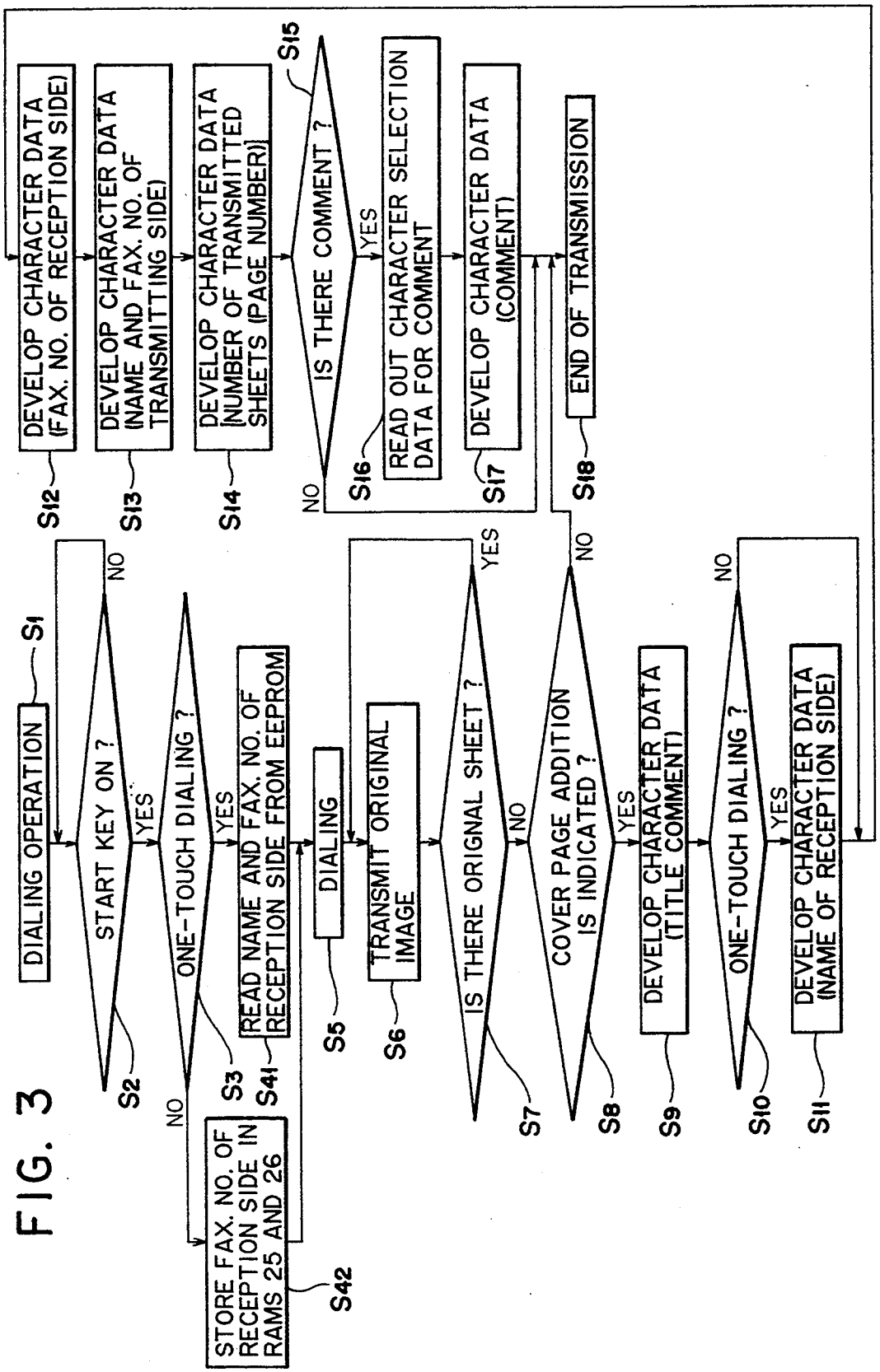
FIG. 3 is a flow-chart for showing a process for performing a cover page addition in the cover page addition unit as shown in FIG. 1.

An operation of the facsimile machine according to this embodiment will be described hereunder with reference to the flow-chart of FIG. 3.

In the transmitting operation, when the ten key 141 and the one-touch key 143 are pushed to perform a dialing operation, an inputted dial information is stored once in a dial information memory area of the RAM 25 (step $S_1$), and waits until the start key 142 is pushed after step $S_1$ (step $S_2$). After the start key 142 is pushed, it is judged as to whether the dialing operation is carried out by the one-touch key 143, that is, as to whether the one-touch dialing operation is carried out or not (step $S_3$). When it is judged in step $S_3$ that the dialing operation is carried out by the one-touch key 143, the character selection data for the name and telephone (fax) number of the reception side, which are registered for the pushed (dialed) one-touch key 143, and the character selection data for the name and telephone number of the transmitting side are read out of the EEPROM 24, and then stored in the memory area of the corresponding addresses of the RAM 26. In addition, the character selection data for the title comment for the cover page stored in the ROM 23 and the invariable character selection data to be printed on the cover page are read out of the ROM 23 and are stored in the memory area of the corresponding addresses of the RAM 26 (step $S_{41}$). Thereafter, the dialing of the telephone (fax) number of the reception side is carried out in step $S_5$. In this case, the telephone (fax) number of the reception side, which is registered for the one-touch 143, is dialed.

If it judged in step $S_3$ that the dialing operation is not carried out by the one-touch key 143, but by the ten key 141, the character selection data for the dialed telephone (fax) number is stored in a memory area of the RAM 25 for the character selection data, and then is stored in a memory area of the prescribed addresses of the RAM 26. Further, the character selection data for the name and telephone (fax) number of the transmitting side are read out of the EEPROM 24 and stored in the corresponding memory areas of the prescribed addresses of the RAM 26, respectively. In addition, the character selection data for the comments of the cover page stored in the ROM 23 and the invariable character selection data to be printed on the cover page are read out and stored in a memory area of the corresponding addresses of the RAM 26 (step $S_{42}$). Successively, the dialing of the telephone (fax) number of the reception side is carried out (step $_5$). In this case, the telephone (fax) number which is input through the ten key 141 is dialed.

After step $S_5$, an original image is read out and then transmitted to the reception side (step $S_6$). The transmitting operation is continued until all the original images of the original sheets (document) supplied to the facsimile machine are completely transmitted to the reception side. In the transmitting operation, the number of the sheets which have been transmitted to the reception side is counted by the sheet detector (in this embodiment, sheet-number detecting unit). A counted value is stored in a counted value memory area of the RAM 25, and is increased by one every the sheet detector 15 outputs a detection signal in response to a pass of a original sheet through the image reader 13 such that the number of the sheets which have been passed through the image reader 13 (transmitted to the reception side) is counted (step $S_7$).

After step $S_7$, it is judged as to whether the cover page addition key 144 is pushed (step $S_8$). When it is judged in the step $S_8$ that the indication of preparation of the cover page has been made, following step $S_8$, the character selection data for the title comment (COVER PAGE) is read out, and a character corresponding to the read-out character selection data is read out of the character generator 22. Further, the read-out character is developed into the corresponding image information in the RAM 112, and is transmitted to the reception side (step $S_9$).

Subsequently to step $S_9$, when it is judged in step $S_{10}$ that the dialing is carried out by the one-touch dial, the character selection data for the name of the reception side, which is stored in the RAM 26, is read out. Further, in the same manner as the step $S_9$, a read-out character for the name of the reception side is developed into an image information in the RAM 112, and is transmitted to the reception side (step $S_{11}$).

Following step $S_{11}$, the character selection data for the telephone (fax) number of the reception side, which is stored in the RAM 26, is read out in the same manner as the step $S_9$. A character corresponding to the telephone (fax) number of the reception side is developed into an image information in the RAM 112, and is transmitted to the reception side in the same manner as described above (step $_{12}$).

When it is judged in step $S_{10}$ that the dialing operation is not carried out by the one-touch dial, step $S_{11}$ is skipped, and after step $S_{10}$, the step $S_{12}$ is executed. The reason for this skipping operation resides in that the name of the reception side is not registered in the RAM 26.

Subsequent to step $S_{12}$, the character selection data for the name and telephone (fax) number of the transmitting side, which are stored in the RAM 26, are read out. Thereafter, in the same manner as step $S_9$, characters corresponding to the name and telephone (fax) number of the transmitting side are developed into the corresponding image information in the RAM 112, and transmitted to the reception side (step $S_{13}$).

After step $S_{13}$, the information on the number of the original sheets (document), which is stored in the sheet-number memory area of the RAM 25, is read out. Thereafter, a character data corresponding to the character selection data for the read-out sheet number information is read out of the character generator 22, developed into the corresponding image information in the RAM 112 and transmitted to the reception side (step $S_{14}$).

Following step $S_{14}$, when it is judged that one of the comments for the cover page is selected by the comment selection key 145 (step $S_{15}$), the character selection data for the selected comment is read out of the ROM 23 and stored in the memory area of the prescribed address of the RAM 26. Thereafter, the character selection data thus stored in the RAM 26 is read out (step $S_{16}$), and the character corresponding to the selected comment is developed into the corresponding image information in the RAM 112 and transmitted to the reception side in the same manner as the step $S_9$ (step $S_{17}$).

If it is judged in step $S_{15}$ that the comment is not selected, step $S_{16}$ and step $S_{17}$ are skipped and developing and transmitting operations for the comment are not carried out.

The transmitting operation is finished by an ending of step $S_{17}$. If it is judged that the comment is not selected in step $S_{15}$, the transmitting operation is finished by an ending of step 14. Further, when preparation of a cover page is not indicated, the transmitting operation is finished by an ending of transmission of all of the original images of the sheets (step $S_{18}$).

If the preparation of the cover page, the one-touch dialing and the comment selection are indicated, a cover page information for the cover page as shown in FIG. 4 is received at the reception side and is printed in the facsimile machine of the reception side after a receiving operation of the original image information is finished at the reception side. If no comment is selected, the last line of the cover page remains blank as shown in FIG. 4.

If the cover page information is transmitted to the reception side after the original image informations are transmitted, the cover page is supplied at the uppermost of the sheets on which the original image informations are printed, so that the cover page is conspicuous, to an user at the reception side.

When the facsimile machine at the reception side receives the character selection data and prints character corresponding to the received character selection data, the cover page information transmitted from the facsimile machine at the transmitting side is not developed into the corresponding image information, but may be directly transmitted in the form of a character selection data. As a result, a time required for transmitting the cover page information can be reduced.

Further, characters on the cover page may be printed several times (for example, about four times) as large as the original size. The CPU 21 may also be included in the controller 111.

According to the embodiment as described above, since the facsimile machine has a cover page addition unit in which a cover page information including at least the name and telephone (fax) number of the transmitting side, the telephone (fax) number of the reception side and the number of sheets to be transmitted are stored in the memory unit. The cover page is transmitted to the reception side when a cover page addition is indicated. A sheet serving as a cover page is automatically prepared and transmitted to the reception side. As a result, a cover page which includes the name and telephone number of the transmitting side, the telephone number of the reception side and the number of transmitted sheets are printed by the facsimile machine at the reception side which has received the cover page informations. Accordingly, the person at the reception side can more easily and smoothly assort received documents.

Moreover, since the name and telephone (fax) number of the transmitting side are not varied, these informations can be programmed into the memory unit. Further, since the telephone number of the reception side and the number of the sheets to be transmitted are automatically renewed through a dialing operation by the dialing unit and by the counting operation of the counting unit, respectively, it is not necessary for the transmitting side to submit a handwritten cover page.

Figures 5, 7:
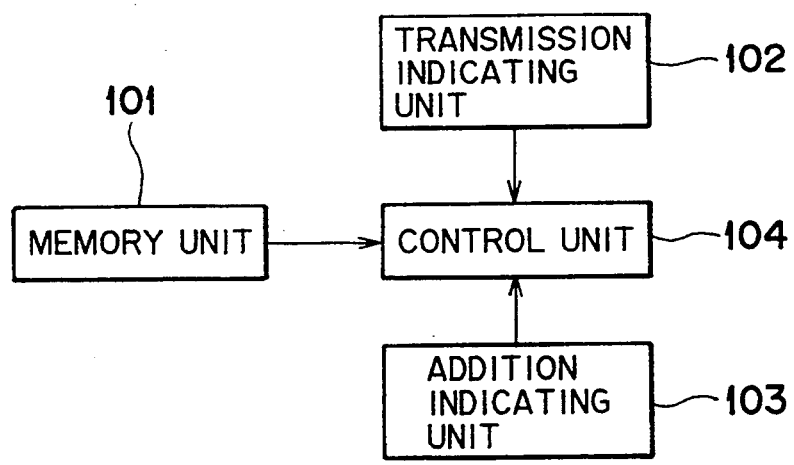
FIG. 5 is a block diagram for the arrangement of a call-back-message addition unit for automatically preparing a call-back-message page.
FIG. 7 shows a call-back-message page which is prepared in accordance with the call-back-message page addition unit as shown in FIG. 5

FIG. 5 is a block diagram for a call-back-message page addition unit for automatically preparing a call back message for an original document, which serves as the appendant unit according to this invention.

The call-back-message page addition unit of this embodiment comprises a memory unit 101 for storing a call-back-message information including at least a telephone (fax) number of the transmitting side and a message requesting a call-back from the reception side after the original document has been transmitted to the reception side, a transmission indicating unit 102 for indicating a start of the transmission of images of the original document, an addition indicating unit 103 for indicating addition of a call back message to the transmitted original document, and a control unit 104 for reading out the call-back-message information stored in the memory unit 101 and transmitting the call-back-message information to the reception side at a predetermined time while converting the call-back-message information into a signal information which can be printed in a facsimile machine of the reception side, when a transmission start and a call-back-message addition are indicated by the transmission indicating unit 102 and the addition indicating unit 103, respectively.

The facsimile machine of the second embodiment has the substantially same construction of the first embodiment as shown in FIG. 2, except that the appendant page addition unit 20 serves as a call-back-message page addition unit for indicating that a call-back-message page is automatically prepared and transmitted to the reception side. The sheet detector 15 serves as a sheet-presence detecting unit for detecting the presence of a sheet in the image reader 13, and the appendant page addition key 144 serves as a call-back-message page addition key for instructing preparation of a call back message and transmission thereof to a reception side. Therefore, the construction of the facsimile machine of the second embodiment is substantially shown in FIG. 2, and thus the description thereof is eliminated.

The operation of the facsimile machine of this embodiment is also substantially identical to that of the first embodiment, except for an operation of automatically preparing a call back message information and transmitting it to the reception side, in place of an operation of automatically preparing a cover page information and transmitting it to the reception side in the first embodiment.

The call-back-message addition unit 20' has the same construction as the cover page addition unit as shown in FIG. 2, and comprises a central processing unit (CPU) 21', a character generator 22', a ROM 23' for storing a program for preparing a call-back-message information and character selection data for selecting a title comment such as "CALL BACK MESSAGE", a request comment such as "PLEASE CALL AT", and an invariable character such as a solid line, a dotted line or an underline in the call back message, and an EEPROM 24' for storing various character selection data for selecting the names and telephone (fax) numbers of the reception sides corresponding to one-touch dials and for selecting the name and telephone number of the transmitting side. Like the cover page addition unit, EEPROM 24' is used so that an user can easily register and alter the names and telephone numbers of the reception and transmitting sides while corresponding to one-touch dials.

The call-back-message addition unit 20' further includes a RAM 25' for storing other character selection data such as telephone (fax) dials (numbers) other than the one-touch dials, and a RAM 26' for storing the desired character data stored in the ROM 23', the EEPROM 24' and the RAM 25' in accordance with addresses which are assigned to any positions on a call-back-message page.

Like the first embodiment, in response to an indication from the control unit 11, the indicated character selection data which are stored in the EEPROM 24', the ROM 23' and the RAM 25' are stored in the RAM 26' in accordance with the program stored in the ROM 23' by the CPU 21', and then the character selection data stored in the RAM 26' are converted into characters by the character generator 22'. The characters are developed in the RAM 112.

Figure 6:
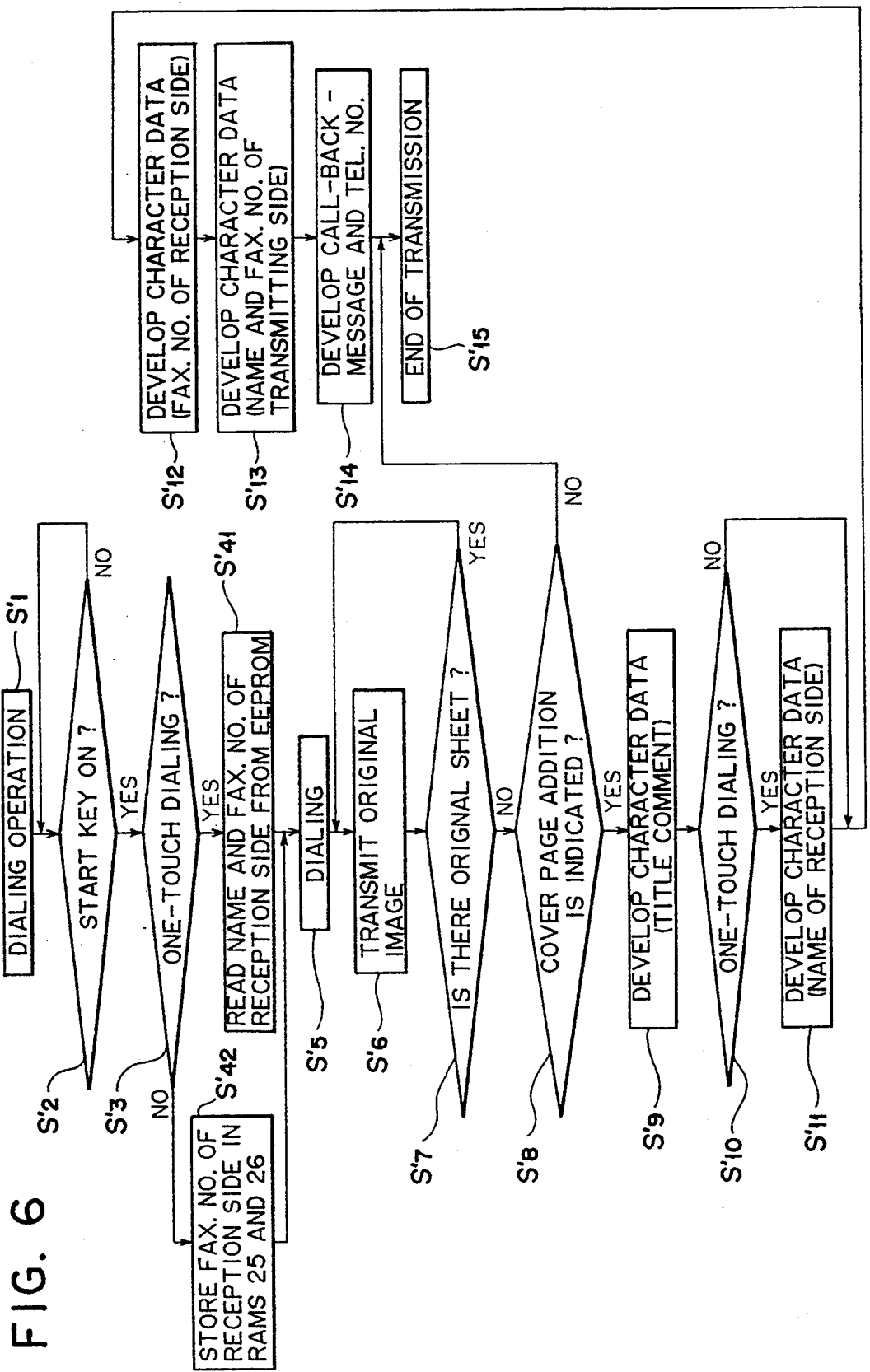
FIG. 6 is a flow-chart for showing a process for performing a call-back-message page addition in the call-back-message page addition unit as shown in FIG. 5.

The operation of the facsimile machine according to this embodiment will be described hereunder with reference to the flow-chart of FIG. 6.

In the transmitting operation, when the ten key 141 and the one-touch key 143 is pushed to perform a dialing operation, a dial information is stored once in a dial information memory area of the RAM 25' (step $S_1'$), and waits until the start key 142 is pushed sequentially to step $S_1'$ (step $S_2'$). After the start key 142 is pushed, it is judged as to whether the one-touch dialing operation is carried out or not (step $S_3'$). When it is judged in step $S_3'$ that the dialing operation is carried out by the one-touch key 143, the character selection data for the name and telephone (fax) number of the reception side registered for the pushed (dialed) one-touch key 143 and the character selection data for the name and telephone number of the transmitting side are read out of the EEPROM 24', and then stored in the memory area of the corresponding addresses of the RAM 26'. In addition, the character selection data for the title comment for the call-back-message page stored in the ROM 23', the character selection data for the comment requesting a call back and the invariable character selection data to be printed on the call-back-message page are read out of the ROM 23' and then stored in the memory area of the corresponding addresses of the RAM 26' (step $S_{41}'$). Thereafter, the dialing of the telephone (fax) number of the reception side is carried out in step $S_5'$. In this case, the telephone (fax) number of the reception side which is registered for the one-touch key 143' is dialed.

When it is judged in step $S_3'$ that the dialing operation is not carried out by the one-touch key 143', but by the ten key 141', the character selection data for the dialed telephone (fax) number is stored in a memory area of the RAM 25' for the character selection data and then is stored in a memory area of the prescribed addresses of the RAM 26'. Further, the character selection data for the name and telephone (fax) number of the transmitting side are read out of the EEPROM 24' and stored in the corresponding memory areas of the prescribed addresses of the RAM 26', respectively. In addition, the character selection data for the title comment of the call-back-message page, the character selection data for the comment requesting the call back, and the invariable character selection data to be printed on the call-back-message page, which are stored in the ROM 23, are read out and stored in a memory area of the corresponding addresses of the RAM 26' (step $S_{42}'$). Subsequently, the dialing of the telephone (fax) number of the reception side is carried out (step $5'$). In this case, the telephone (fax) number, which is input through the ten key 141, is dialed.

After step $S_5'$, an original image is read out and then transmitted to the reception side (step $S_6'$). The transmitting operation is continued until all original images of the original sheets (the whole document) inserted to the facsimile machine are completely transmitted to the reception side, that is, until the presence of the original sheets is not detected by the sheet-presence detecting unit 15 (step $S_7'$).

Subsequent to step $S_7'$, it is judged in step $S_8'$ as to whether the call-back-message addition key 144' is pushed. It is judged in step $S_8'$ that the call back message is indicated, following step $S_8'$, the character selection data for the title comment "CALL BACK MESSAGE" is read out, and a character corresponding to the read-out character selection data is read out of the character generator 22'. Further, the read-out character is developed into the corresponding image information in the RAM 112 and transmitted to the reception side (step $S_9'$).

Following the step $S_9'$, when it is judged in step $S_{10}'$ that the dialing is carried out by the one-touch dial, the character selection data for the name of the reception side, which is stored in the RAM 26', is read out. In the same manner as step $S_9'$, a read-out character for the name of the reception side is developed into an image information in the RAM 112, and then transmitted to the reception side (step $S_{11}'$).

Further, after step $S_{11}'$, the character selection data for the telephone (fax) number of the reception side, which is stored in the RAM 26', is read out in the same manner as step $S_9'$. A character corresponding to the telephone (fax) number of the reception side is developed into an image information in the RAM 112 and is transmitted to the reception side in the same manner as described above (step $_{12}'$).

When it is judged in step $S_{10}'$ that the dialing operation is not carried out by the one-touch dial, step $S_{11}'$ is skipped, and step $S_{12}'$ is executed. The reason for this skipping operation resides in that the name of the reception side is not registered in the RAM 26'.

Subsequent to step $S_{12}'$, the character selection data for the name and telephone (fax) number of the transmitting side, which are stored in the RAM 26', are read out. Thereafter, in the same manner as step $S_9'$, characters corresponding to the name and telephone (fax) number of the transmitting side are developed into the corresponding image information in the RAM 112, and transmitted to the reception side (step $S_{13}'$).

Following step $S_{13}'$, the character selection data for the call-back-message informations such as a comment "PLEASE CALL AT" and the telephone number of the transmitting side are read out. Like step $S_9'$, these informations are developed in the corresponding image informations in the RAM 112' and transmitted to the reception side (step $S_{14}'$).

The transmitting operation is finished by an ending of step $S_{14}$. If it is judged that the call-back-message transmission is not indicated in step $S_{18}$, the transmitting operation is finished by an ending of the transmission of all of the images of the original sheets in step $_{17}$ (step $S_{15}'$).

When the call-back-message transmission is indicated, the call-back-message information is received by the facsimile machine of the reception side subsequently after the original images have been received. A call back message, as shown in FIG. 7 is printed in the facsimile machine of the reception side.

Like the cover page addition unit, if the call-back-message information is transmitted to the reception side after the original image informations are transmitted, the call-back-message page is supplied at the uppermost of the sheets on which the original images are printed, so that the call-back-message page is conspicuous to an user at the reception side.

When the facsimile machine at the reception side receives the character selection data and prints a character corresponding to the received character selection data, the call-back-message information transmitted from the facsimile machine at the transmitting side is not developed into the corresponding image information, but may be directly transmitted in the form of a character selection data. As a result, a time required for transmitting the call-back-message information can be reduced.

Further, characters on the call-back-message page may be printed several times (about four times) as large as the original size. The CPU 21' may be included in the controller 111.

As described above, since the facsimile machine of this embodiment has the call-back-message addition unit capable of automatically transmitting to the reception side a call-back-message information including at least a comment requesting the reception side to call back to the transmitting side and the telephone number of the transmitting side, it is not necessary for the transmitting side to manually prepare (handwrite) a call-back-message page which has an information on the telephone number of the transmitting side and requests a telephone contact with the reception side after original images on original sheets (document) have been transmitted to the reception side. In addition a protocall system is not necessary to be provided to both of the facsimile machines of the transmitting and reception sides.

In the above embodiments, the preparations of a cover page and a call-back-message page are separately and independently carried out by different units 20 and 20'. However, these pages can be prepared by the same unit comprising CPU, ROM, RAM and other elements. Further, the appendant pages which can be prepared by this invention are not limited to the cover page and the call-back-message page, and various messages and comments may be printed on the same page (sheet) or different pages (sheets).

Further, in the above embodiments as described above, the appendant information is printed on a different sheet from a sheet on which an original image is printed at the reception side to form a cover page or a call-back-message page. However, the appendant information may be printed on a blank portion of a sheet on which an original image is printed at the reception side.

What is claimed is:

1. A facsimile machine for transmitting and receiving original images on original sheets between transmitting and reception sides, each original sheet bearing an original image, including:
    an image reading means for reading the original images;
    a sheet-presence detecting unit for detecting a presence of unread original sheets to be transmitted;
    an appendant information adding unit for automatically adding appendant information comprising cover page information to the original images to be transmitted from the transmitting side and transmitting the appendant information to the reception side together with the original images, said appendant information adding unit transmitting the appendant information after the sheet-presence detecting unit detects the absence of unread original sheets to be transmitted so that the appendant information is printed on a sheet separate from sheets on which the original images are printed at the reception side without being printed on the sheets on which the original images are printed, said appendant information adding unit comprising:
    a memory unit for storing the appendant information,
    a transmission indicating unit for indicating a start of a transmitting operation,
    an addition indicating unit for indicating addition of the appendant information to the original images, and
    a control unit for reading out the appendant information stored in said memory unit and transmitting the read-out appendant information to the reception side after the original images when the start of the transmitting operation and the addition of the appendant information are indicated; and
    a sheet detector detecting each of the original sheets being transmitted to the reception side to count the number of transmitted sheets and storing a counted value representing the number of transmitted sheets in said memory unit, the appendant information adding unit automatically printing, on the sheet with the appendant information, a number of transmitted sheets detected by the sheet detector when the sheet-presence detecting unit detects the absence of unread original sheets.

2. The facsimile machine as claimed in claim 1, wherein the cover page information includes at least a name and a telephone number of the transmitting side, a name of the reception side and the number of sheets to be transmitted.

3. A facsimile machine as claimed in claim 2, further comprising an one-touch dialing unit for connecting the transmitting side to the reception side on a telephone circuit with one-touch dial.

4. A facsimile machine as claimed in claim 1, wherein said memory unit includes an EEPROM for storing character selection data for names and telephone numbers of the transmitting side, names and telephone numbers of the reception sides corresponding to one-touch dials, a ROM for storing character selection data for comments and invariable characters to be printed on an appendant page, a first RAM for storing names and telephone numbers of the reception sides other than those of the one-touch dials, a second RAM having memory areas provided with addresses corresponding to any positions on the appendant page for storing the desired character selection data outputted from said EEPROM, said ROM and said first RAM, a character generator for outputting characters in accordance with the character selection data stored in said second RAM, and a third RAM for storing the characters outputted from said character generator as the appendant information.

\* \* \* \* \*